United States Patent [19]

Wagner et al.

[11] 4,441,646
[45] Apr. 10, 1984

[54] PROCESS FOR MANUFACTURING PLASTICALLY DEFORMED LIGHT METAL OBJECTS AND SHAPED BODIES HAVING A LIGHT METAL PART

[75] Inventors: Alfred Wagner, Steisslingen; Adolf Ames, Hilzingen; Ulf Hodel, Engen, all of Fed. Rep. of Germany

[73] Assignee: Swiss Aluminium Ltd., Chippis, Switzerland

[21] Appl. No.: 256,293

[22] Filed: Apr. 22, 1981

[30] Foreign Application Priority Data

May 3, 1980 [DE] Fed. Rep. of Germany ....... 3017076

[51] Int. Cl.³ .................. B23K 28/02; B23K 20/02
[52] U.S. Cl. .................................. 228/116; 228/265; 228/263.16
[58] Field of Search ............... 72/258; 228/112, 113, 228/114, 115, 116, 263 E, 265; 188/322.19

[56] References Cited

U.S. PATENT DOCUMENTS

| | | | |
|---|---|---|---|
| 3,041,718 | 7/1962 | Stuchbery | 228/265 |
| 3,222,761 | 12/1965 | Sabo | 72/258 X |
| 3,235,946 | 2/1966 | Neu et al. | 72/258 X |
| 3,693,238 | 9/1972 | Hoch et al. | 228/114 X |
| 3,740,828 | 6/1973 | Buchinski et al. | 228/263 E X |
| 3,893,550 | 7/1975 | Pablo de la Rosa | 188/322.19 |
| 3,973,715 | 8/1976 | Rust | 228/112 |

FOREIGN PATENT DOCUMENTS 55-128315 10/1980 Japan .................................. 72/258

Primary Examiner—Kenneth J. Ramsey
Attorney, Agent, or Firm—Bachman and LaPointe

[57] ABSTRACT

Manufacture of a light metal shock absorber by impact extrusion of a light metal blank whereby, during the impact extrusion process itself, a steel strip is brought into contact with the base of the part which becomes free of obstructive light metal oxide as a result of impact extrusion and is as a result metallically bonded to the said base. The steel component of the composite body is provided with a steel ring which is welded or otherwise appropriately joined during or after the extrusion step. The light metal sleeve can be welded or otherwise appropriately joined to light metal after impact extrusion. The production of a light metal shock absorber is a special case of plastic deformation of light metal and the principles which lead to metallic bonding between light metal and steel or another metal are also valid here.

2 Claims, 7 Drawing Figures

PROCESS FOR MANUFACTURING PLASTICALLY DEFORMED LIGHT METAL OBJECTS AND SHAPED BODIES HAVING A LIGHT METAL PART

BACKGROUND OF THE INVENTION

The invention relates to a method for manufacturing light metal objects which are shaped by plastic deformation and which, before use, are joined securely to parts or objects made of steel or another metal. The invention also relates to a shaped body with a light metal part in particular in the form of a hollow body which is connected to a steel part or object of an appropriate metal.

Light metal cylinders which are employed for example as shock absorber sleeves are usually joined to a lower steel part by means of a flanged edge which is made during the production of the cylinder and into which the steel part is introduced and clamped in place. Such a connection between two steel parts is disclosed for example in U.S. Pat. No. 2,891,525.

The method used to date to manufacture the shaped part mentioned at the start is however very disadvantageous as the connection between two different metals is not sufficiently reliable and requires several steps to make it.

In view of this it is an object of the invention to eliminate the known shortcomings and to allow the process for manufacturing light metal shaped bodies, which have to be joined to steel or another appropriate material for their use in practice, to become simpler and economically more attractive.

SUMMARY OF THE INVENTION

This object is achieved by way of the process according to the invention in that, in the course of the said process, the light metal in the form of a blank or the like is plastically deformed or shaped. The resultant region of the light metal body which is free of obstructing oxide briefly during the shaping process is brought into contact with a steel component, e.g. a steel strip, and joined to the steel strip by metallic bonding, preferably by friction welding, i.e., join during shaping. It turns out that it is particularly favorable, after plastically deforming or shaping the blank on the composite component made of steel or the like metal, to weld on or otherwise attach the steel object or objects to parts made of another metal.

As a result of the proposed method according to the invention, to manufacture for example a shock absorber sleeve of light metal with steel base it is no longer necessary to make a light metal cylinder in a special step and then clamp it to the steel part by flanging over a specially prepared holding edge; instead, and saving at least one production step, a light metal body is shaped out of a blank and joined immediately to the steel strip or the like. Finally, or preferably before joining the light metal and steel components, a further steel object or facility, in the case of the shock-absorber sleeve its mounting ring, is welded on to the steel part. The result is a high grade product which is made by a simplified manufacturing process viz., a shaped body according to the invention, its light metal part being joined to the steel part, or a part made of another appropriate material, whereby the joining is not made by clamping but by metallic bonding; loosening of the steel part, such as was possible for example with conventional shock-absorber sleeves, is out of the question.

According to another feature of the process according to the invention the shaping of the light metal part of the blank is made via the well known impact extrusion method.

The scope of the invention is such that it includes not only the shaped body, the light metal component of which was shaped while the steel part remained unchanged; it concerns even more providing the steel part with a special cross-sectional shape without the metallic bonding between the two components being impaired.

BRIEF DESCRIPTION OF THE DRAWINGS

Further advantages, features and details of the invention are revealed in the following description of a preferred exemplified embodiment of the invention and with the help of the drawings viz.

DETAILED DESCRIPTION

Using an aluminum blank 2 of thickness h a cylinder 4 with cylinder wall 5 and base 6 of thickness i is produced by impact extrusion.

Figure 1:
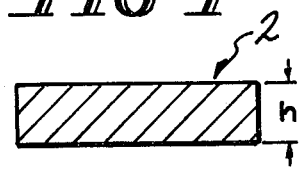
FIG. 1: Cross section through an aluminum blank.
Figure 2:
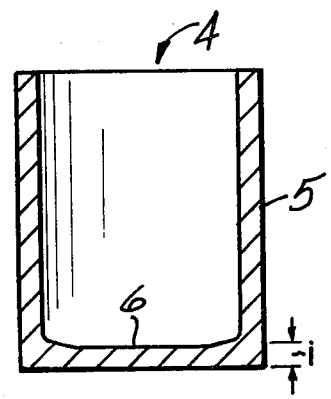
FIG. 2: Longitudinal section through a sleeve manufactured from the aluminum blank shown in FIG. 1.
Figure 3:
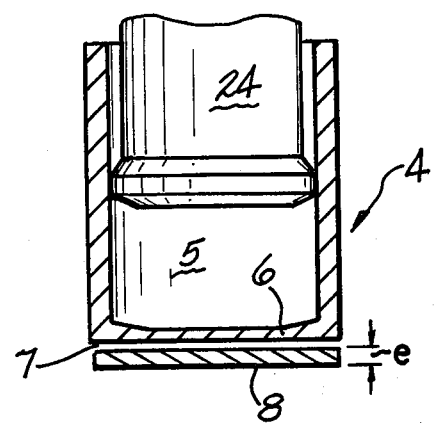
FIG. 3: A sketch of the production steps involved in the shaping of the sleeve.
Figure 4:
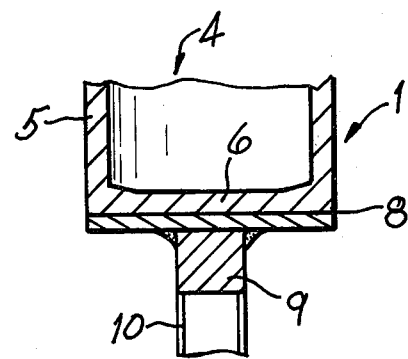
FIG. 4: A section through a part of an example of a shock absorber sleeve.
Figure 5:
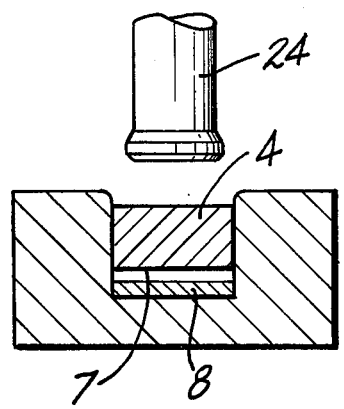
FIGS. 5-7 illustrate the process steps in accordance with the present invention.
Figure 6:
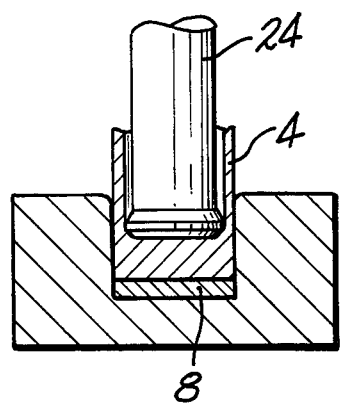
Figure 7:
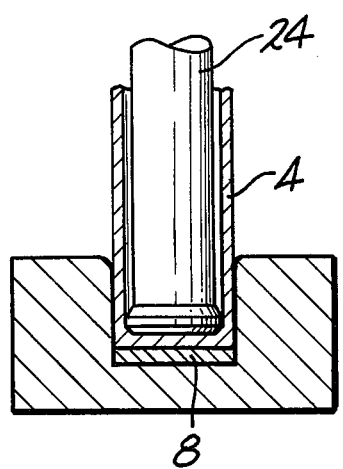

FIG. 3 illustrates the shaping of the cylinder 4 by a stamping tool 24, only a part of which is shown.

The bottom surface 7 of the cylinder base 6, which is free of oxide briefly during the shaping process, is joined in this condition, i.e. during shaping, to a steel strip 8 of thickness e by means of friction welding.

A steel rod 9, the end of which away from the steel base 8 is bent into a ring 10, is then welded on to the steel base 8 of the shock absorber sleeve resulting from that base 8 and the aluminum cylinder 4.

The deformation of the blank 2 is illustrated in the drawing as being made by backwards impact extrusion; of course any other suitable means of plastic deformation can be employed for this.

What is claimed is:

1. Process for manufacturing plastically deformed light metal objects which are joined permanently to a dissimilar metal component which comprises: providing a light metal blank; providing a dissimilar metal component of steel adjacent said light metal blank; plastically deforming said blank to form a light metal part thereby producing a portion thereof free from interfering oxide; and metallically joining said portion to said dissimilar metal, wherein said steel component is joined to a second steel component before joining to said portion, and wherein said steel component and said portion are joined by friction welding.

2. Process according to claim 1 wherein said second steel component is a steel mounting ring.

* * * * *